United States Patent [19]

Pierresteguy

[11] 4,390,755

[45] Jun. 28, 1983

[54] DISTRIBUTION FRAME

[76] Inventor: Jean-François J. Pierresteguy, 35, rue de la Barauderie, Darvault, Nemours, France, 77140

[21] Appl. No.: 272,373

[22] Filed: Jun. 10, 1981

[30] Foreign Application Priority Data

Jun. 18, 1980 [FR] France .................. 80 13483

[51] Int. Cl.³ ............................................. H04Q 1/14
[52] U.S. Cl. ..................................... 179/98; 361/428; 361/429
[58] Field of Search ............... 179/98, 91 R; 361/428, 361/429

[56] References Cited

U.S. PATENT DOCUMENTS

| | | | |
|---|---|---|---|
| 2,098,321 | 11/1937 | Treptow | 179/98 |
| 3,927,277 | 12/1975 | Wuyts et al. | 179/98 |
| 4,002,856 | 1/1977 | Sedlacek et al. | 179/98 |

FOREIGN PATENT DOCUMENTS

| | | | |
|---|---|---|---|
| 2315485 | 10/1974 | Fed. Rep. of Germany . | |
| 2034177 | 8/1979 | Fed. Rep. of Germany | 361/429 |
| 7416262 | 6/1974 | France . | |
| 7603363 | 2/1977 | France . | |
| 2317843 | 4/1977 | France . | |
| 7610266 | 1/1978 | France . | |
| 175027 | 4/1961 | Sweden | 179/98 |

*Primary Examiner*—Stafford D. Schreyer
*Attorney, Agent, or Firm*—Lowe, King, Price & Becker

[57] ABSTRACT

The distribution frame comprises first connectors which are linked to first cables and second connectors which are linked to second cables. Two-wire link cords interconnect terminals of the first connectors to terminals of the second connectors. The first and second connectors are arranged in two coplanar sub-matrices whose lines are double interlaced. This eases access to the cables and link cords linking the connectors through just one side of the distribution frame. Any congestion of the link cords is obviated by the fact that each link cord must run through rings set out between two adjacent columns where both or each of these columns includes the connectors to be linked by the link cord.

14 Claims, 6 Drawing Figures

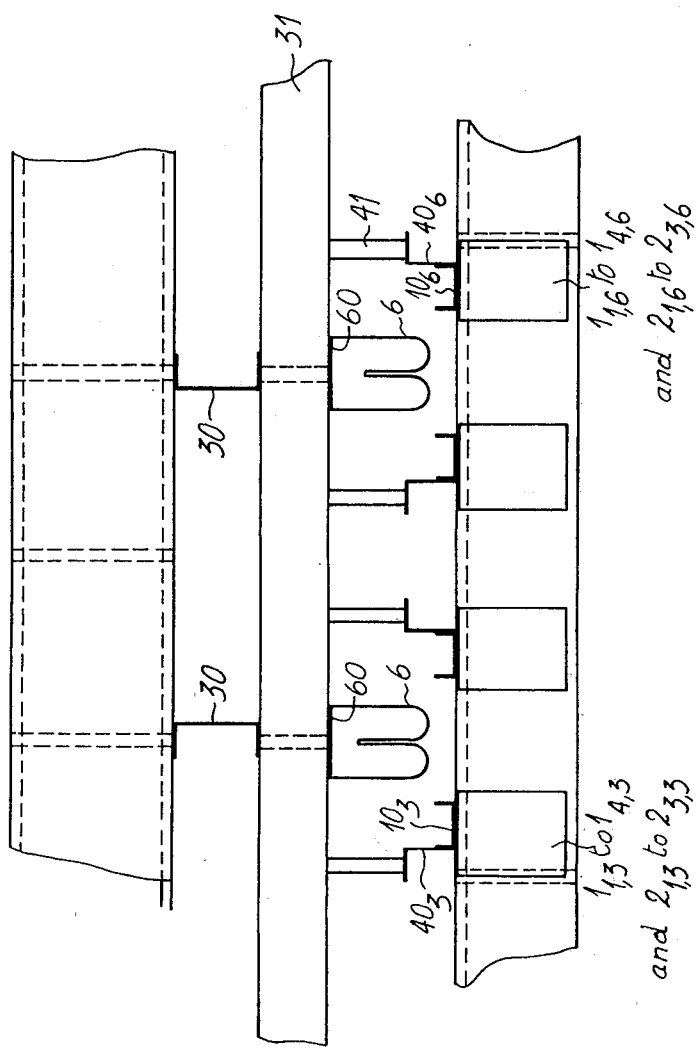

DISTRIBUTION FRAME

BACKGROUND OF THE INVENTION

1. Field of the Invention

The present invention concerns a distribution frame which is intended for interconnecting the terminals of first connectors linked to the ends of first cables to the terminals of second connectors linked to the ends of second cables through link cords.

A distribution frame for a telephone exchange is particularly intended for connecting first telephone line cables referred to as external cables to second cables referred, to as internal cables, serving the switching equipments in the telephone exchange. The external cables are linked to the first connectors, referred to as cable heads, which are possibly provided with overcurrent or overvoltage protective means. The internal cables are linked to the second connectors, referred to as connection strips. The link cords, called "jumpers" or "flexible conducting cords," enable internal variable connections to the distribution frame to be made between the external and internal cables via the cable heads and the connection strips.

2. Description of the Prior Art

The known description frames may be split into two main types. One is described as a double-sided frame, and the other is described as a tunnel distribution frame.

Double-sided distribution frames are described in French Patent Application No. 2,229,177 and French Patent Application No. 2,317,843 claiming the priority of U.S. Patent Application Ser. No. 591,037 filed June 27, 1975 now U.S. Pat No. 4,002,856. They are composed of horizontal rows of cable heads which include over-current and over-voltage protective means and to which the network multipair cables are connected, and horizontal rows of connection strips to which the multipair cables coming from the switching equipments are connected. Each cable head is arranged vertically and each connection strip is laid horizontally. The heads and strips are mounted on a parallelepiped metallic structure having two main vertical sides carrying the rows of strips and the rows of heads respectively. Between these two sides, a trellis work of bars and vertical and horizontal cross pieces carries the link cords, each of which links one terminal pair of a cable head on one of the sides to one terminal pair of a connector strip on the other side.

The separation of the cable head positions and the connection strip positions in a double-sided distribution frame enables work teams belonging to different departments, dealing with lines and switching for instance, to carry out the many wiring operations. However, as a result of this separation, the types of cable heads and connection strips used do not always match and the latter are not arranged for the link cords to be of an optimum length.

Such an arrangement implies, for most of the links to be created, that two factors be brought into play to connect a link cord. Indeed, the length of the link cord is variable and sometimes very long. Moreover, due to the lack of coordination between the departments assigned to the external lines and those assigned to the internal installation at the exchange, the cable heads and connection strips are not arranged with the same thought as regards optimizing link cord disposition. The routing rule for a link cord which should be respected, namely horizontal routing along the horizontal connection strip and a change of level in line with the corresponding cable head, is followed unfortunately only to a very small extent. What is more, since accessibility to the first link cords laid in place is in certain cases rather difficult, they cannot be removed. The accessible routes thus become congested and it is impossible to make many of the links.

A second type of distribution frame, referred to as the tunnel type, is disclosed in French Patent Application 2,340,658. This type adopts an inverted U structure having inner vertical and parallel lateral sides for carrying the connection strips and the cable heads respectively. The horizontal upper part of the frame joins the two lateral sides and carries cradle stirrups having fingers through which the link cords pass. The link cords rise vertically upwards from the connection strips along the corresponding inner side, then run horizontally across the upper tunnel part and finally drop down vertically to the cable heads along the other inner side.

Amongst the drawbacks of the tunnel distribution frame, the following can be mentioned. The link cords are necessarily very long since all of them must run via the upper part of the frame. There are therefore no short link cords. In addition, the frame must not be too high so as not to hinder the positioning of the link cords. As a result, use of a tunnel frame is restricted to a dependent telephone exchange which serves a relatively low number of telephone lines.

Furthermore, the German Patent Application No. 2,315,485 teaches a distribution frame for a telephone exchange. In this frame, first connectors also called distributors serve first cables and are arranged as per a first upper vertical sub-matrix and second connectors serve second cables and are arranged in a lower vertical sub-matrix positioned below the first sub-matrix. The two sub-matrices are co-planar and the columns or rows of connectors in the two sub-matrices are colinear two-by-two.

In this distribution frame, the two sub-matrices thus form two wholly individual assemblies, respectively upper and lower. Horizontal and vertical guides are provided between these two assemblies, such as stirrups or horizontal section rings through which the link cords are fed. Each cord links a first connector in any one column of the first sub-matrix to a second connector in any one column of the second sub-matrix.

The latter frame type is therefore analogous to a tunnel frame having a U section with lateral sides that have been flattened out into a vertical plane. Consequently, the drawbacks of this frame are analogous to those already broached for a tunnel distribution frame. Indeed, the jumpers or connection cords need to be very long since all of them must run through the stirrup guides between the two sub-matrices. As a result, there are no short link cords. In addition to this, the frame height must be small, and be decidedly less than that of the tunnel frames, since it is about three times that of a sub-matrix. This type of frame is therefore geared to use in a dependent telephone exchange which serves a relatively small number of telephone lines.

OBJECTS OF THE INVENTION

The main object of this invention is to provide a distribution frame overcoming the drawbacks set forth hereinabove.

Another object of this invention is to provide a distribution frame in which each link cord follows a mandatory route which is provided between two columns common to the two sub-matrices and which is easily accessible from the same side of the distribution frame through which the internal and external cables are pulled. Cable management and the lay-out of the cable heads and connection strips to be wired up to the inside of the frame are consequently closely linked, thereby avoiding any cluttering up of the link cords.

SUMMARY OF THE INVENTION

Accordingly, the invention provides a structure which comprises first connecting means arranged in a first sub-matrix of columns and rows, second connecting means arranged in a second sub-matrix of columns and rows; the sub-matrix is coplanar with said first sub-matrix. Link cords connect each terminals of one of said first connecting means to terminals of one of said second connecting means. In this structure, the columns (resp. rows) of the two sub-matrices are aligned respectively and the rows (resp. columns) of the two sub-matrices are double interlaced. Each column (resp. rows) thus comprises an alternate series of first connecting means or cable heads and second connecting means or connection strips.

The mandatory routing for the link cords consists of going through the corridor between two adjacent columns of the composite matrix made up of the two sub-matrices. Two neighbouring corridors through which link cords pass are separated by two adjacent columns of the composite matrix. Each corridor comprises vertically superimposed rings.

The first and second connecting means linked by one or several link cords are advantageously arranged in one and the same column or two adjacent columns, which prevents any congestion of the link cords in the frame and contributes two employed short link cords.

The rings in a corridor are equal in number to the rows in the composite matrix, i.e. each ring in a corridor is in line with two connection strips or two cable heads from adjacent columns. To avoid any loose link cords and tangling of link cords, prevent any cord which might directly link a cable head and a connection strip and which later might hinder the path of other link cords in the corridor, each link cord routed in a corridor runs through at least two adjacent rings of said corridor.

A structure for carrying the internal and the external cables with respect to the exchange includes two parallelepiped assemblies behind the cord corridors the assemblies are composed of horizontal grooves and vertical channels respectively parallel to the lines and columns in the two sub-matrices. The cables are then drawn through the same side of the structure of the distribution frame. To enhance cable connection management still further, each first or external cable is linked to first connecting means set out along the same row of the first sub-matrix and each second or internal cable is connected to second connecting means laid out again along the same row of the second sub-matrix.

BRIEF DESCRIPTION OF THE DRAWING

Other advantages of this invention will become more apparent from reading the following detailed description of preferred embodiments of the invention with reference to the corresponding accompanying drawings in which:

FIG. 6 is a detailed plan view of the distribution frame between the vertical corridors A—A and B—B of FIG. 1.

DESCRIPTION OF THE PREFERRED EMBODIMENTS

For a clearer idea, the drawings and the description hereunder relate to the structure of a distribution frame for a telephone exchange which comprises:

$M \times N = 32$ first connecting means in the form of cable heads $1_{m,n}$ (specifically heads $1_{1,1}$ to $1_{4,8}$) where each cable head can be coupled up to a maximum of 112 two-wire telephone lines of first cables, referred to as external cables, where $M=4$ and $N=8$, m is an index having each value from 1 to 4, and n is an index having each value from 1 to 8;

$(M-1) \times N = 24$ second connecting means in the form of connection strips $2_m$, $2_n$ (specifically $2_{1,1}$ to $2_{3,8}$) where each connection strip can be coupled up to a maximum of 128 two-wire telephone lines of second cables, referred to as internal cables, which link up the distribution frame and the corresponding switching equipments in the telephone exchange, where m is an index having each value from 1 to 3 and n is an index having each value from 1 to 8; and N connection strips $2_{0,n}$ (specifically $2_{0,1}$ to $2_{0,8}$) referred to as additional strips having a role defined later, where n is an index having each value from 1 to 8.

Figure 1:
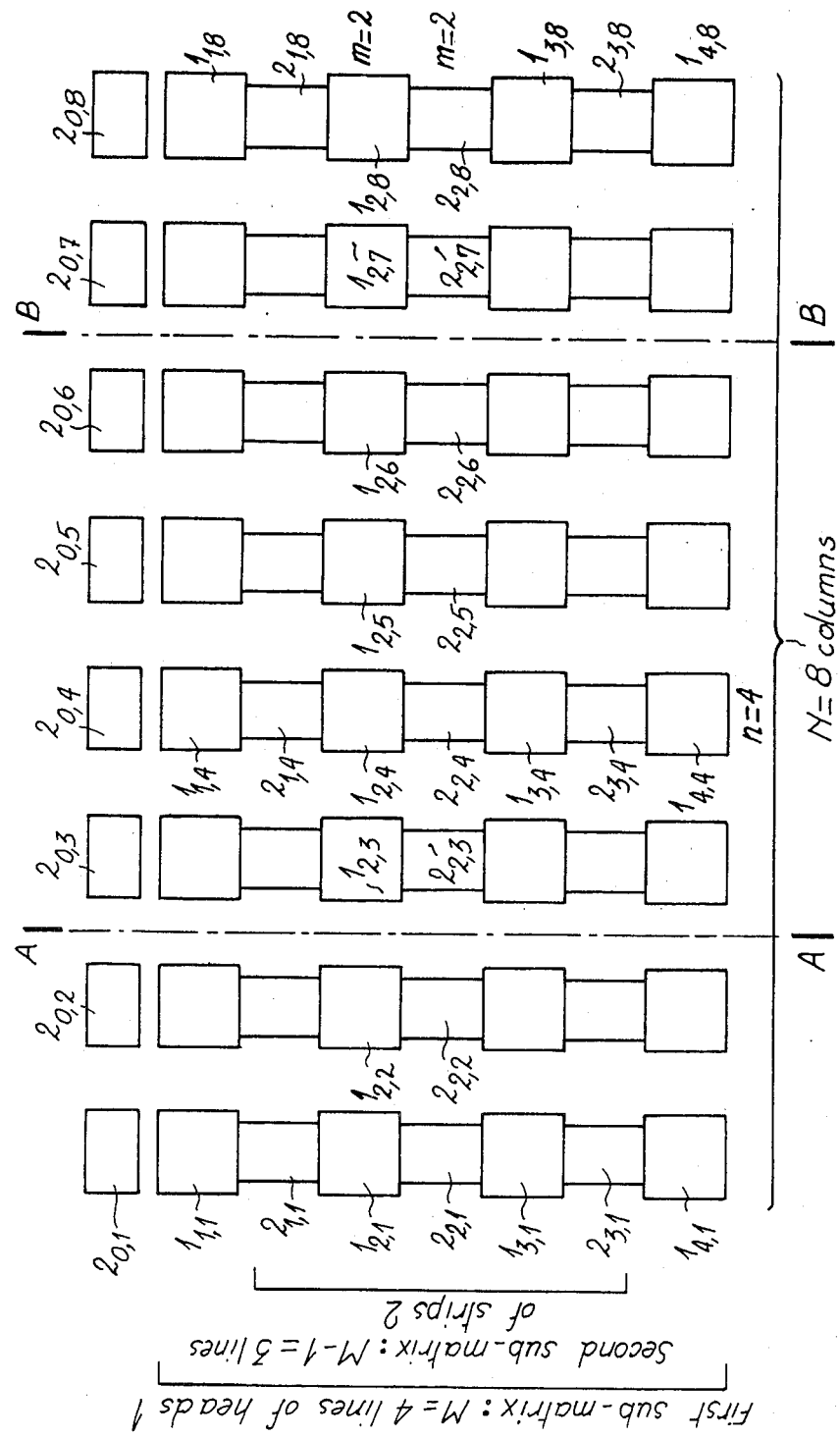
FIG. 1 is a schematic front view of a distribution frame embodying the invention, showing the relative lay-out of the cable heads and connection strips.

As can be seen on FIG. 1, depicting the schematic distribution of the strips and heads, the distribution frame embodying the invention is set out around a rectangular composite matrix which is made up by double interlacing rows of a first sub-matrix including the cable heads 1 and lines of a second sub-matrix including the connection strips 2. The first and second sub-matrices are coplanar and having corresponding aligned columns. To distinguish between the heads 1 and the strips 2 more clearly, the heads and strips are respectively represented by squares and rectangles, although in practice the heads and strips are both generally rectangular. The first sub-matrix comprises $M=4$ rows and $N=8$ columns of cable heads $1_{m,n}$. The second sub-matrix comprises $M-1=3$ rows and $N=8$ columns of connection strips $2_{m,n}$. The index m is an integer lying between 1 and $M=4$ for the cable heads and is an integer lying between 1 and $M-1=3$ for the connection strips. The index n is an integer lying between 1 and $N=8$ both for the connection heads and the strips. In the embodiment shown in FIG. 1, the composite matrix external lines coincide with the rows in the first sub-matrix of cable heads 1.

Figure 4:
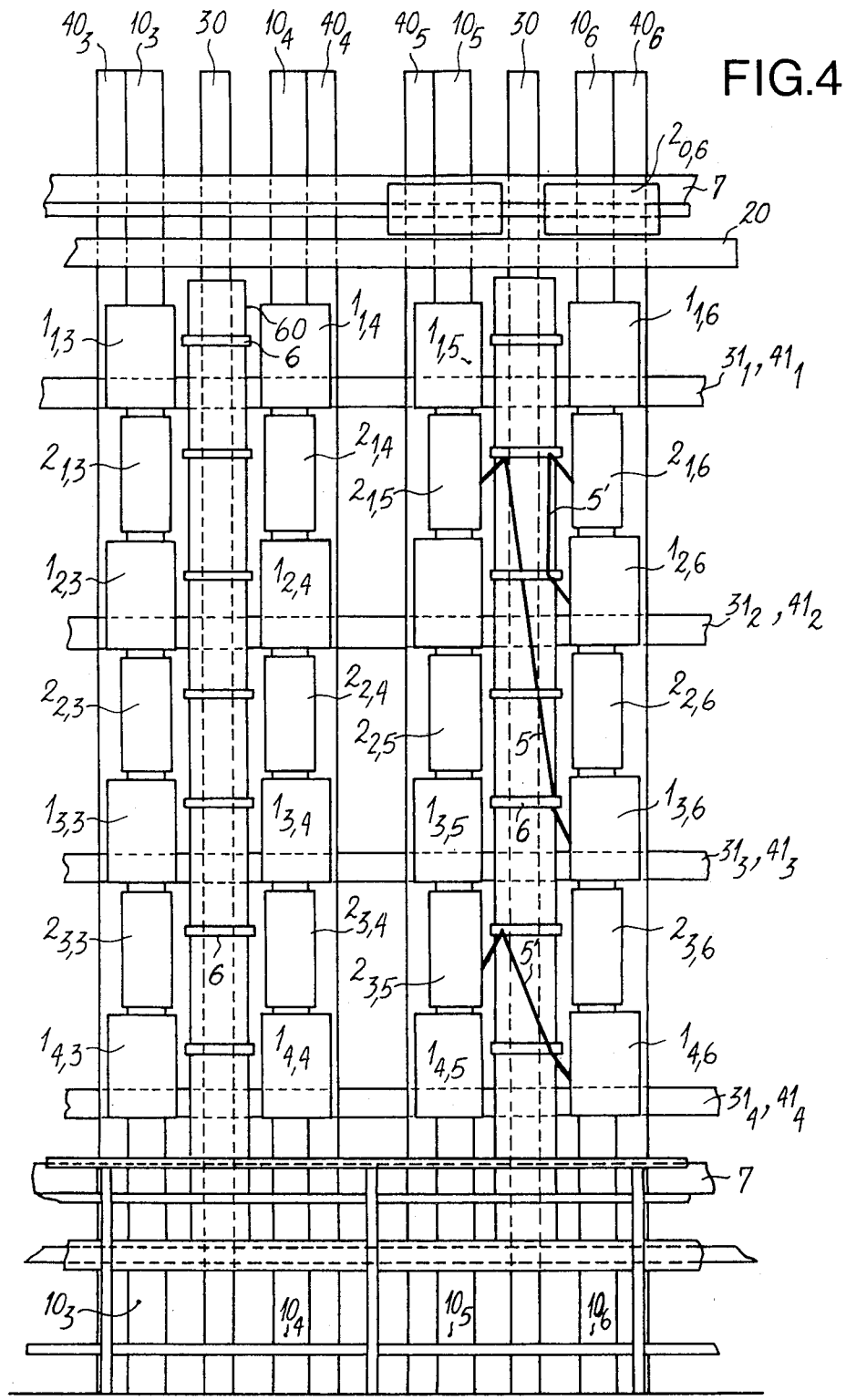
FIG. 4 is a detailed front view of the distribution frame between the vertical corridors A—A and B—B of FIG. 1.

In one column the cable heads 1 and the connection strips 2 alternate, i.e. are double interlaced, and are fixed in one column-holder $10_1$ to $10_8$ in the frame rack (FIG. 4). The column-holders $10_1$ to $10_8$ are coplanar with the front side of the frame. In the nth column, for instance, starting from the upper row of the cable heads $1_1$ to $1_{1,8}$, are disposed the upper head $1_{1,n}$, the strip $2_{1,n}$, the head $1_{2,n}$, the strip $2_{2,n}$, the head $1_{3,n}$, the strip $2_{3,n}$ and the lower head $1_{4,n}$.

Throughout this lay-out, all the vertical columns are identical in relation both to the bulk and the capacity of the external cables and the internal cables connected to the switching equipments. The height of the distribution frame can be adjusted in terms of the height available in the room accommodating the various distribution frame and switching equipment units of the telephone exchange and, generally speaking, each connection strip or each connection head may be reached without using a ladder.

Taking the illustrated embodiment in the drawing, the height of a column having three connection strips and four cable heads is approximately 2 meters. The number of heads and strips per column is determined in terms of statistical data especially concerning the density of the traffic carried, i.e. average line holding rates on the external network and switching equipment sides. These average rates are 70% and 85% respectively. As a result, on the external cable side $(4 \times 112) \times 70\% \simeq 313$ lines are available and on the internal cable side $(3 \times 128) \times 85\% \simeq 326$ lines are available for each column. It is noted, however, that the lower or upper positioning of at least a fifth additional row of cable heads and at least a fourth row of connection strips can be envisioned were there to be an increase in traffic from the exchange during operations.

Figure 2:
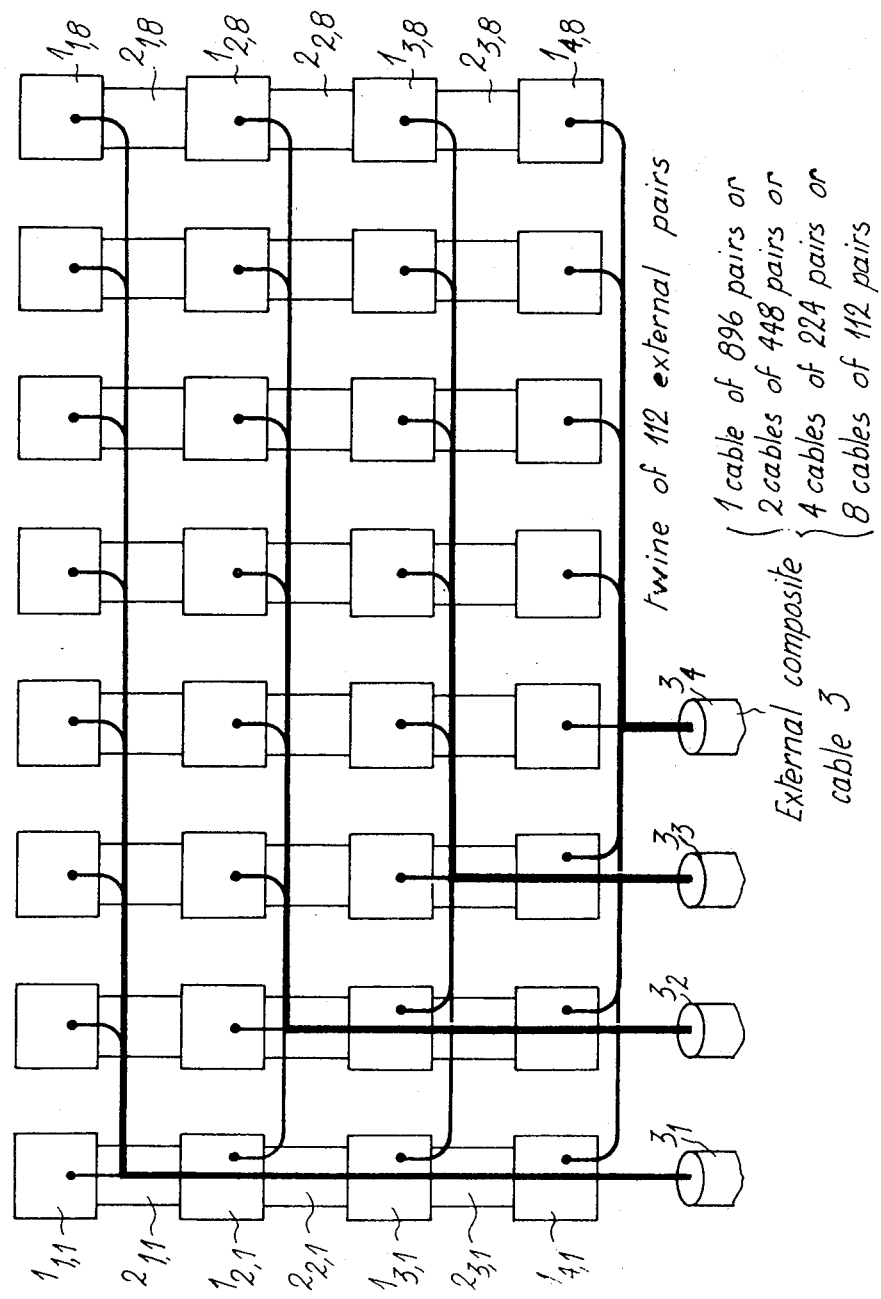
FIG. 2 is a schematic rear view of the distribution frame of the paths of the first so-called external cables.
Figure 3:
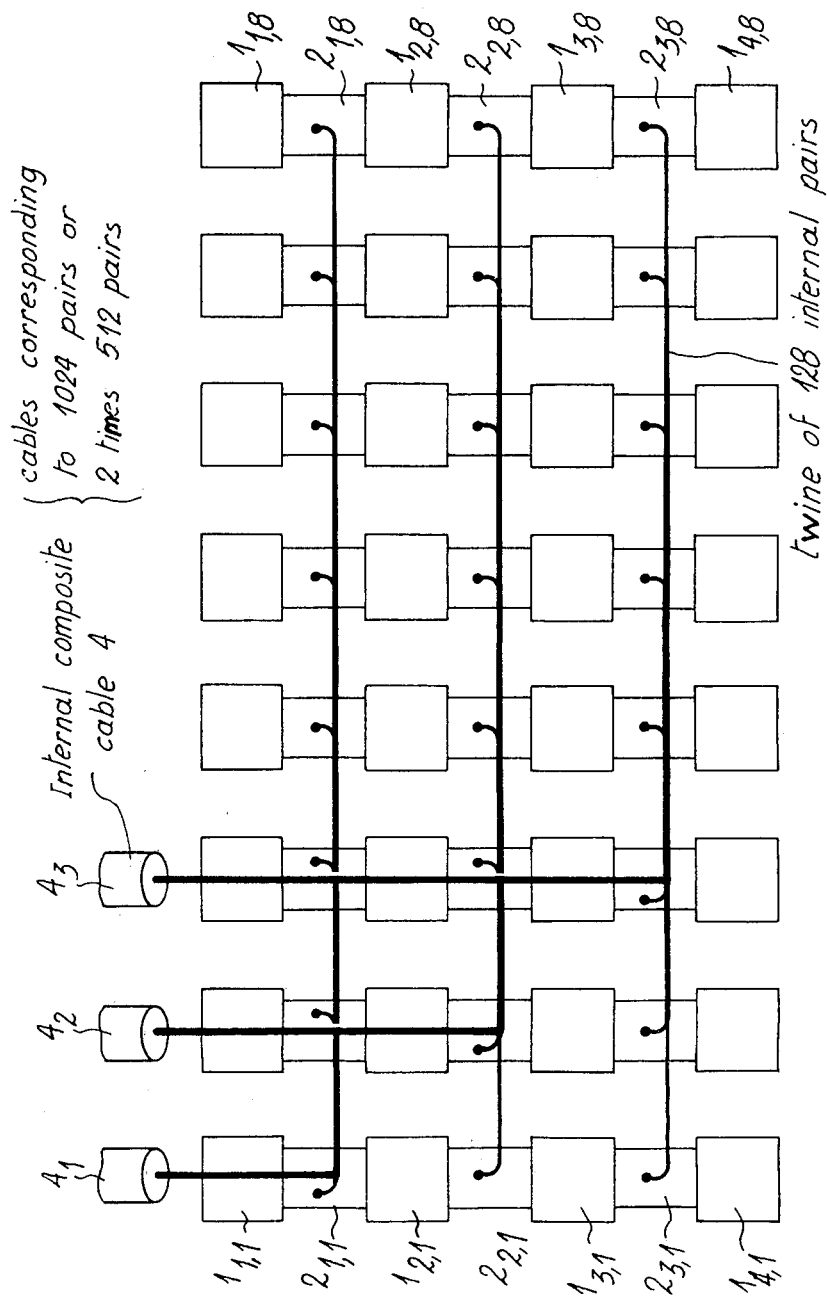
FIG. 3 is a view analogous to that of FIG. 2 of the paths of the second so-called internal cables directly serving the switching equipments.

As depicted in FIGS. 2 and 3, all the external lines connected to another frame or that come from external cables which are usually underground and run beneath the exchange building floor, and all the internal lines that are connected to the switching equipments, are respectively connected to the cable heads and the connection strips on the same vertical so-called rear side of the distribution frame. These connections are not described in detail since they are of a well-known type. Likewise, the head and strip structure does not come within the scope of this invention. Whilst on this matter, it is noted that the connection heads and strips are preferably as described in French Pat. No. 2,347,797 or French Patent Application 2,443,758 (U.S. Patent Application Ser. No. 101,718).

For each pair of row wires, all these heads and strips comprise a pluggable module including overcurrent protective means and/or overvoltage protective means, e.g. fuses and/or protectors, and can have self-striping or so-called "quick-contact" terminals.

Furthermore, the term "external cable" as used hereinafter refers to a bundle of $8 \times 112 = 896$; $4 \times 112 = 448$; $2 \times 112 = 224$ or 112 external lines (or pairs of wires) coming from the external network or another frame, the external cable is connected to the rear sides of cable heads 1. The term "internal cable" used hereinafter refers to a bundle of $4 \times 128 = 512$ or $8 \times 128 = 1024$ internal lines (or pairs of wires) coming from switching equipment termed subscriber's line connecting units and line selecting elements respectively, the internal cable is wired to the rear sides of connection strips 2.

In reference to FIG. 2, it can be seen that an external cable having 896 pairs or two external cables each having 448 pairs or four external cables each having 224 pairs, or eight external cables each having 112 pairs, designated by an external composite cable 3, has pairs linked to the rear side of cable connection heads $1_{m,1}$ to $1_{m,8}$ which are arranged along a row of the first sub-matrix. According to the illustrated embodiment, the pairs in external composite cables $3_1$ to $3_4$ are free for example in the lower part of the distribution frame and are connected to the rows of cable heads $1_{1,1}$ to $1_{1,8}$, $1_{2,1}$ to $1_{2,8}$, $1_{3,8}$ and $1_{4,1}$ to $1_{4,8}$ respectively. The ends of the external composite cables are, for example, respectively colinear with the first four columns in the composite matrix to the left in FIG. 2.

As shown in detail in FIGS. 4 to 6, 896 pairs of an external composite cable $3_m$ are laid vertically against vertical U-shaped channels $30_m$ up to the level of the line of corresponding cable heads $1_{m,1}$ to $1_{m,8}$. The eight 112-pair twines of composite cable 3 are carried by a horizontal groove $31_m$ and are linked to the rear sides of the eight heads $1_{m,1}$ to $1_{m,8}$ in the corresponding row of the first sub-matrix.

The path taken by the three internal composite cables $4_1$ to $4_3$ corresponding to an internal cable of 1024 pairs or to two internal cables of 512 pairs each is illustrated schematically in FIG. 3 and is analogous with those previously described. An internal cable $4_m$ comes, for instance, from the upper part of the frame. Its 128-pair twines are respectively connected to the rear sides of the eight connection strips $2_{m,1}$ to $2_{m,8}$ in the same horizontal line of the second sub-matrix. The free twines of an internal composite cable $4_m$ first of all run together inside a vertical channel $40_m$ and then in a horizontal groove $41_m$ well above the line of the eight corresponding strips $2_{m,1}$ to $2_{m,8}$.

Routing conditions such as these provide excellent opening out of the composite cable twines. To avoid any confusion and concentration of the external 3 and internal 4 composite cables, the channel and groove structure 30-31 and the channel and groove structure 40-41 preferably form two rectangular-mesh parallelepipeds which are parallel to the rear side of the distribution frame, as shown in FIG. 4. The vertical channels 30 or 40 can be eliminated when the external 3 or internal 4 composite cables are drawn through a vertical side of the frame.

Figure 5:
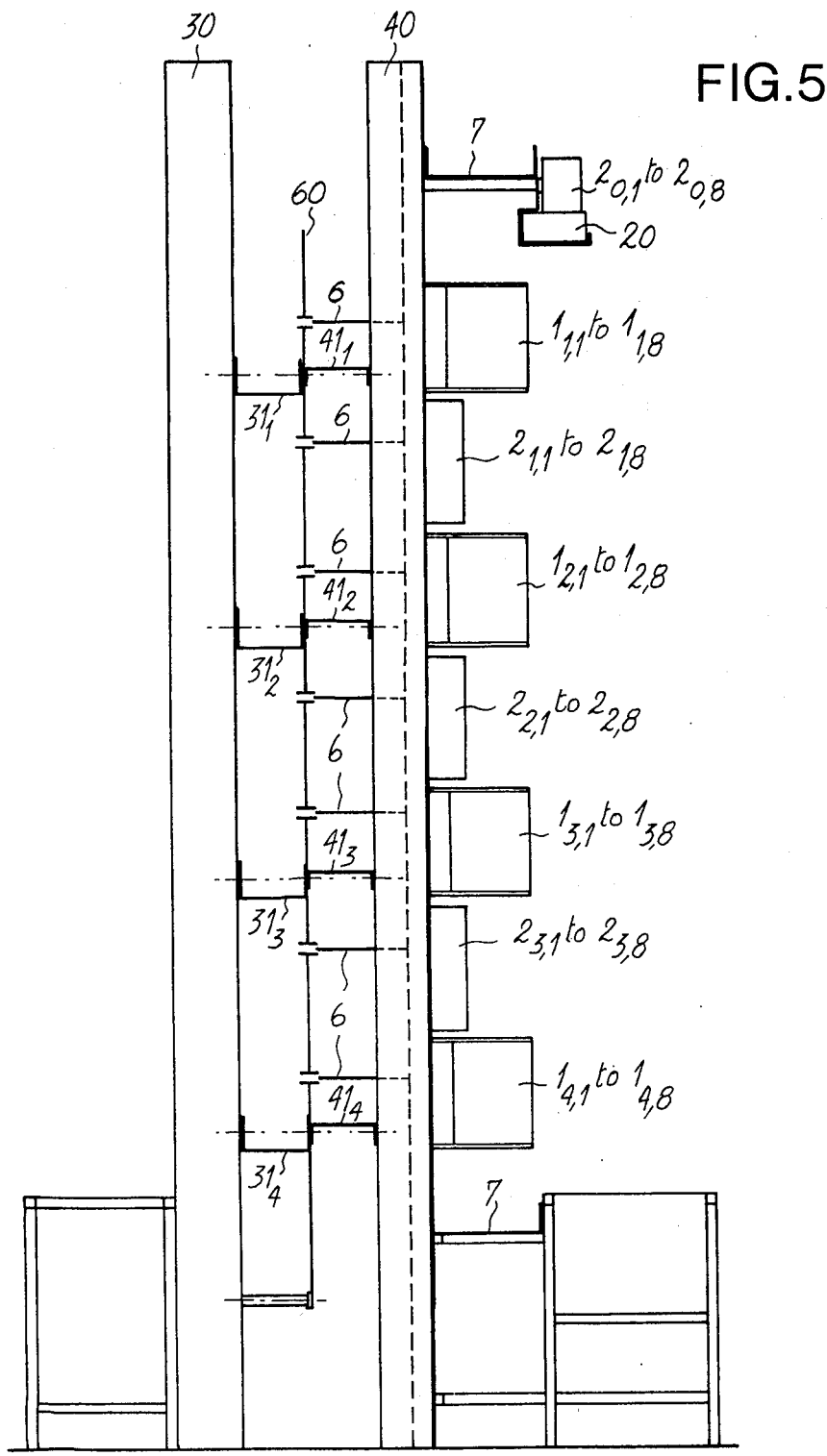
FIG. 5 is a detailed side view of the distribution frame.

Referring to FIGS. 4 to 6, the path taken by the two-wire link cords 5 called "jumpers" or "flexible conducting cords" is now described.

Link cords 5 join the terminals that are connected to any pair of wires in a cable head 1 to the terminals that are connected to any pair of wires in a connection strip 2. A single link cord 5 is shown in FIG. 4 to avoid overloading the drawing. This link cord 5 connects a pair of wires in the external cable $3_3$ which is wired to the cable head $1_{3,6}$, to a pair of wires in the internal cable $4_1$ which is wired to the connection strip $2_{1,5}$.

Each link cord, such as cord 5, runs vertically in a vertical corridor which is between two adjacent columns of heads and strips in the composite matrix, such as columns $10_5$ and $10_6$. In general, and except in special cases as stipulated below, a link cord connects a terminal pair of a strip to a terminal pair of a head which is included in the frame and belongs to the same column or the adjacent column. The strip is included in the frame and belongs to one of these two adjacent columns. Consequently, as illustrated in the example, two neighbouring vertical corridors comprising link cords are separated by two adjacent columns of connection strips and cable heads, which are separated by an empty link cord corridor. The distribution frame comprises N/2=4 vertical corridors which are filled with link cords and which are the first and second, third and fourth, fifth and sixth and seventh and eighth columns of heads and strips respectively. If the frame includes an odd integer number N of adjacent head and strip columns, there are N/2+0.5 vertical link cord corridors, where one of them is on a vertical side of the frame.

When a link cord 5 is being put in place, it must go through at least two rings. These two rings make up part of a corridor composed of (2M−1) horizontal rings 6 that are centered on the vertical median axis of the corridor and are vertically superimposed between the two adjacent head and strip columns. It is preferable that the rings in a corridor be spaced vertically such that, for each wire pair of cable heads, such as heads $1_{3,5}$-$1_{3,6}$, resp., for each wire pair of strips, such as strips $2_{1,5}$-$2_{1,6}$, along the same row of two adjacent columns, a ring 6 is positioned at two-thirds the height of the heads, resp. of the strips in the row. This contributes towards properly centering the link cords 5. The planes of the rings 6 are horizontal and are secured for instance by welding to rear vertical uprights 60 which come in front of the grooves 31 for example, i.e. between and behind two adjacent head and strip columns, as shown in FIGS. 5 and 6. A ring 6 can be formed by placing two semi-circular sections horizontally side by side. According to a preferred embodiment, the internal area of a ring 6 is approximately 35 cm$^2$ thus providing enough space for 900 link cords 5 to pass through it.

Because neighbouring cable heads 1 and connection strips 2 are on differing levels or as superimposed horizontal rows a link cord can not be pulled directly and horizontally. A link cord of this type which can be employed in the prior art frame, would have the effect of cutting the vertical path and of creating cord crossovers. In accordance with this invention, the shortest link cord, such as cord 5' shown in FIG. 4, runs through two immediately superimposed rings 6 and at the levels of the two neighbouring rows respectively comprising the cable head, such as head $1_{4,6}$ or $1_{2,6}$, and the connection strip, such as strip $2_{3,5}$ or $2_{1,6}$, including wire pairs to be connected. Referring still to the preferred embodiment, a short link cord is approximately 40 cm long.

The link cord management principle enables a maximum number of cord links within one and the same vertical corridor of rings to be satisfied. In the illustrated embodiment, each wire pair of external cable 3 which is connected to one head 1 amongst four heads in a column has access to one of the wire pairs of the external cable $4_1$ to $4_3$ amongst 6×128=768 of the six strips 2 in said column and the adjacent column the said column and adjacent column are separated by a ring corridor. In this way, one wire pair of external cable can have access to three distinct bundles, each having 2×128=256 wire pairs in an internal cable 4. When a device of the switching equipments referred to as connecting units of a subscriber's line or a line selecting element served by an internal cable is congested a wire pair of an external cable connected to a strip can have access to the other four connecting units or the other two selecting elements having internal connection cables spread out along the other two strip lines.

Spare routes for the link cords 5 are provided for special cases where additional loads, depending for instance on telephone traffic or line congestion, prevent the use of an available link cords path between a head and a strip. In other words, the special routes are used if there is no available access left to one of the switching equipment devices connected to the distribution frame. When this case arises, the link cord is drawn from the cable head firstly along the corresponding ring corridor and then along one of the two horizontal conduits 7 the corridor and conduits are respectively above and below the composite head and strip matrix, as shown in FIGS. 4 and 5. These horizontal conduits provide access to the strips in another distribution frame to the switching equipment.

The distribution frame embodying the invention also comprises a row of additional connection strips $2_{0,1}$ to $2_{0,8}$ coming beneath the composite matrix of heads $1_{4,1}$ to $1_{4,8}$ and strips $2_{1,1}$ to $2_{3,8}$ or above the composite matrix as shown in FIGS. 1, 4 and 5. Each additional connection strip $2_{0,1}$ to $2_{0,8}$ in a column is provided access to certain auxiliary functions in the processing of a telephone call, such as telephone charging, recording of statistical data on telephone traffic, etc. The link cords pulled from connection heads 1 that are to be connected to an additional connection strip $2_{0,1}$ to $2_{0,8}$ run through the rings of the corresponding adjacent corridor above the cable head and then follow a horizontal groove 20 which is beneath the additional strips as shown in FIGS. 4 and 5.

Connection point coding for an external wire pair linked to a cable head at the frame input, resp. for any internal wire pair linked to a connection strip at the frame output, complies with matrix indexing. An external wire pair is indicated by a triplet (m, n, p) where m varies between 1 and M and refers to the m$^{th}$ cable head in the column carrying index n, n varies between 1 and N and refers to the n$^{th}$ column to which the cable head belongs and p varies between 1 and P=112 and refers to the number of the external wire pair in the cable head. An internal wire pair is also indicated by a triplet (m, n, q) where m varies between 1 and (M−1) (or M or (M+1)) and refers to the m$^{th}$ connection strip in the column carrying index n, n varies between 1 and N and refers to the n$^{th}$ column to which the strip belongs and q varies between 1 and Q=128 and refers to the number of the internal wire pair in the connection strip.

While there has been described and illustrated one specific embodiment of the invention it will be clear that variations in the details of the embodiment specifically illustrated and described may be made without departing from the true spirit and scope of the invention as defined in the appended claims.

What I claim is:

1. A structure comprising:
   first connecting means arranged in a first sub-matrix of columns and rows;
   second connecting means arranged in a second sub-matrix of columns and rows, the second sub-matrix being coplanar with said first sub-matrix; and
   link cords for interconnecting terminals of one of said first connecting means to terminals of one of said second connecting means;
   corresponding columns (resp. rows) of said two sub-matrices being aligned respectively and the rows (resp. columns) of said two sub-matrices being double interlaced.

2. A structure as claimed in claim 1 wherein said link cords are only routed along corridors between two adjacent columns (resp. rows) of a composite matrix formed by said two sub-matrices.

3. A structure as claimed in claim 2 wherein two neighbouring corridors including link cords are separated by two adjacent columns (resp. rows) of said composite matrix.

4. A structure as claimed in claim 2 wherein first and second connecting means to be interconnected by one or several link cords are always in the same column (resp. rows) or in two adjacent columns (resp. rows).

5. A structure as claimed in claim 2 wherein each of said corridors comprises plural rings, the number of rings being equal to the number of said rows (resp. columns) of said composite matrix and at the respective levels as said first and second connecting means of said columns (resp. rows) of said composite matrix.

6. A structure as claimed in claim 5 wherein each link cord routed in a corridor runs through at least two adjacent rings of said corridor.

7. A structure as claimed in claim 5 or 6 wherein each ring comes to two thirds the dimension of a first, resp. second connecting means in relation to a column (resp. row).

8. A structure as claimed in claim 1 or 2 comprising two channel and groove assemblies which are respectively parallel to said rows and columns of said two sub-matrices and which are adapted to the path taken by first and second cables to be connected to said first and second connecting means respectively.

9. A structure as claimed in claim 8 wherein said two channel and groove assemblies are arranged in front of the same side of said two sub-matrices.

10. A structure as claimed in claim 1 wherein said first connecting means laid out along a same row (resp. column) of said first sub-matrix is linked to a same first cable and said second connecting means laid out along a same row (resp. column) of said second sub-matrix is linked to a same second cable.

11. A structure as claimed in claim 1 or 10 comprising at least one conduit parallel to said rows (resp. columns) of said two sub-matrices for routing link cords connected to the first connecting means out from said structure.

12. A structure for telephone exchange as claimed in claim 1 or 10 comprising a row (resp. column) of second additional connecting means for linking, via connecting means and link cords, first cables to auxiliary means for processing telephone calls conveyed by said first cables.

13. A telephone exchange distribution frame for connecting external telephone line cables to internal cables serving switching equipments of the exchange comprising first and second sub-matrices, one of the sub-matrices including cable head elements each having connections to external telephone line cables, the other of the sub-matrices including connecting strip elements having connections to an internal cable, the first sub-matrix including M elements in a first direction and N elements in a second direction, the first and second directions being at right angles to each other with one of the directions being vertical and the other direction horizontal so the elements in one direction are in columns and the elements in another direction are in rows, the second sub-matrix including (M−1) elements in the first direction and N elements in the second direction, elements n in the second direction of the first and second sub-matrices being aligned, elements m in the first direction of the first sub-matrix being between elements (m−1) and m in the first direction of the second sub-matrix, where m is selectively every integer from 1 to (M−1) and n is selectively every integer from 1 to N, cable links for connecting connection terminals of element [m,n] of the first sub-matrix to connection terminals in elements [m,n] and [(m+1), n] of the second sub-matrix, connection terminals of element [m, n] of the first sub-matrix being connected to connection terminals of elements [m,1], [m,2] . . . [m,N] of the first sub-matrix and connection terminals of element [m,n] of the second sub-matrix being connected to connection terminals of elements [m,n] and [(m+1), n] of the first sub-matrix and to connection terminals of elements [m,1],[m,2] . . . [m,N] of the second sub-matrix, the first and second sub-matrices being coplanar to form a composite matrix.

14. A telephone exchange distribution frame for connecting external telephone line cables to internal cables serving switching equipments of the exchange comprising a first series of parallel elongated members through each of which extends an internal composite cable, the members of the first series extending in a first direction, a second series of parallel elongated members through each of which extends an external composite cable and an internal composite cable, the members of the second series extending in a second direction, the first and second directions being at right angels to each other, with one of the directions being vertical and the other direction horizontal so the members extending in one of the directions are columns and the members extending in another one of the directions are rows, the elongated members having intersections to form a planar matrix of rows and columns, a cable head having connection terminals to external composite cables mounted at each of the intersections, the cable head at a particular intersection having connections to composite cables in the members of the first and second series which intersect at the particular intersection, a connecting strip having connection terminals to an internal cable mounted on each of the members of the first series between adjacent ones of the intersections, the connecting strips extending only in the first direction, the connecting strips including internal cables connected to the internal cable of the members of the second series via the intersections, a third series of parallel elongated members extending in the first direction, the members of the third series being between adjacent members of the first series, each member of the third series carrying link cords for connecting cables in the strips only on both of the members of the first series adjacent the respective member of the third series to connection terminals of cable heads on a member of the first series adjacent the respective member of the third series.

* * * * *